No. 650,274. Patented May 22, 1900.
W. S. RAWSON.
VOLTAIC BATTERY OPERATED WITH FUSED MATERIALS.
(Application filed June 19, 1899.)

(No Model) 2 Sheets—Sheet 1.

Witnesses:
Dennis Sumby
Geo. W. Rea.

Inventor
William S. Rawson
By James L. Norris.
Attorney

No. 650,274. Patented May 22, 1900.
W. S. RAWSON.
VOLTAIC BATTERY OPERATED WITH FUSED MATERIALS.
(Application filed June 19, 1899.)
(No Model.) 2 Sheets—Sheet 2.

Witnesses:
Dennis Sumby,
Geo. W. Rea.

Inventor:
William S. Rawson
By James L. Norris.
Attorney

UNITED STATES PATENT OFFICE.

WILLIAM STEPNEY RAWSON, OF LONDON, ENGLAND.

VOLTAIC BATTERY OPERATED WITH FUSED MATERIALS.

SPECIFICATION forming part of Letters Patent No. 650,274, dated May 22, 1900.

Application filed June 19, 1899. Serial No. 721,141. (No model.)

*To all whom it may concern:*

Be it known that I, WILLIAM STEPNEY RAWSON, a citizen of England, residing at 21 Greycoat Gardens, Westminster, London, England, have invented certain new and useful Improvements in Voltaic Batteries Operating with Fused Materials, (for which I have applied for a patent in Great Britain, dated November 22, 1898, No. 24,570,) of which the following is a specification.

The invention relates to voltaic batteries of that class in which electricity is generated by the oxidizing action of a fused salt upon a molten metal or alloy separated from it by a porous pot or diaphragm, such oxidized metal or alloy being continuously or intermittently reduced by means of carbonaceous gas or vapor and the salt being recuperated by the action of oxygen or air forced into it. In order that the chemical actions may take place, the metal or alloy must be kept at a high temperature. When lead is used, this temperature is as high as 1,850° Fahrenheit. Hitherto this temperature has been maintained by applying external heat to a metal vessel containing the molten metal. Such a method is very wasteful of heat and has other drawbacks, one of which is the difficulty of regulating the heat so as to keep the temperature within the limits required by the nature of the salts.

This invention has for its object the economical production and retention as well as the easy regulation of the heat required and in addition the dealing with the products of combustion so as to economically utilize the heat which they contain when they issue from the apparatus. For the purpose of retaining the heat, or, in other words, to check radiation the cell is constructed as I shall describe.

Figure 1:
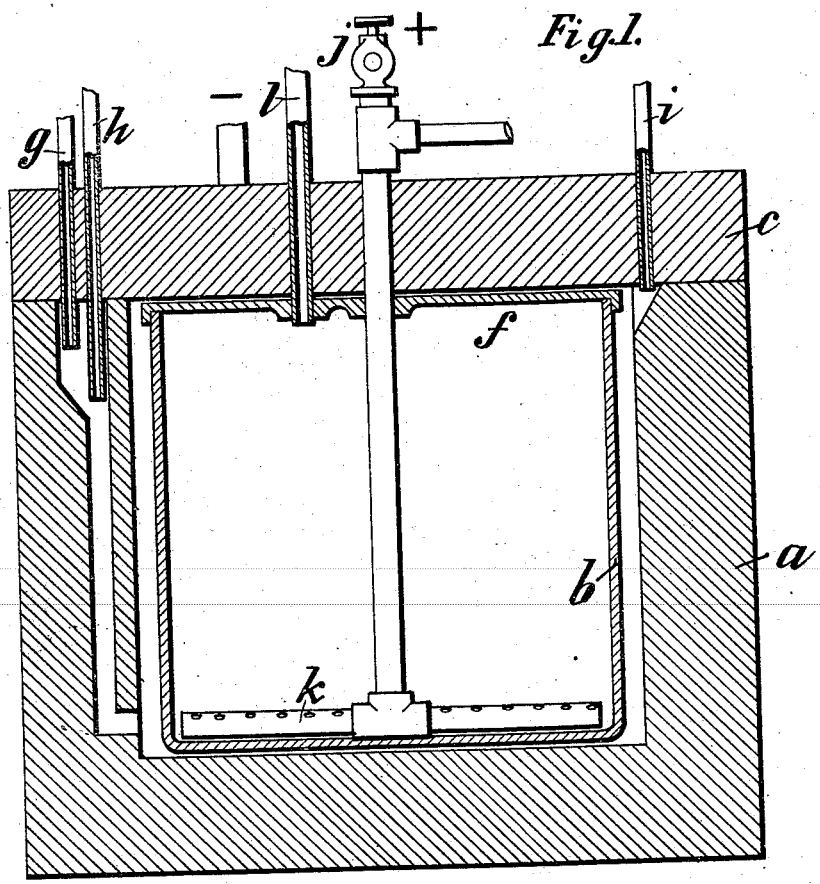
Figure 2:
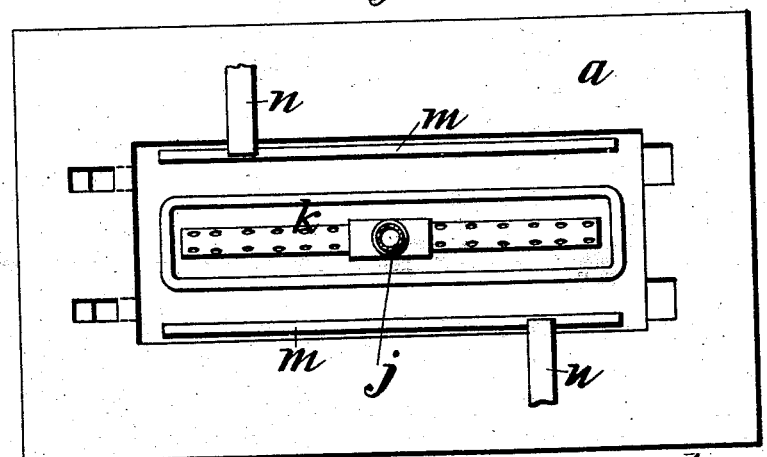
Figure 3:
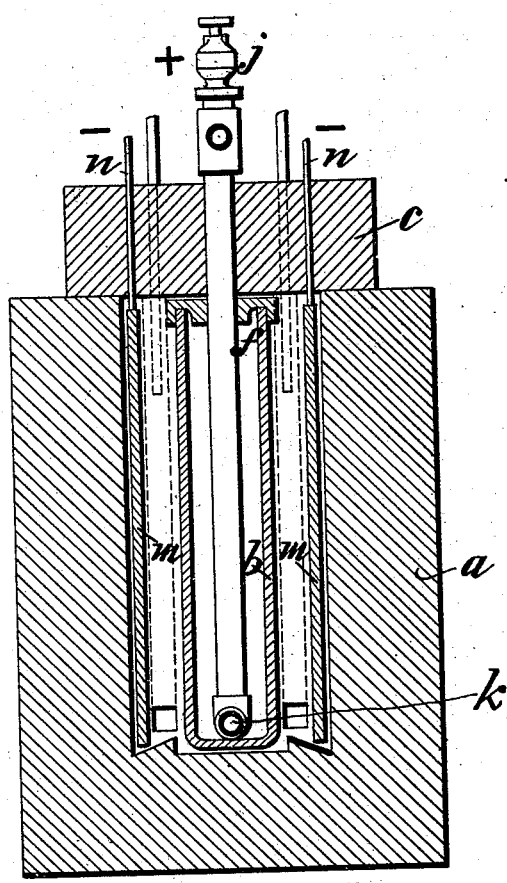
Figure 4:
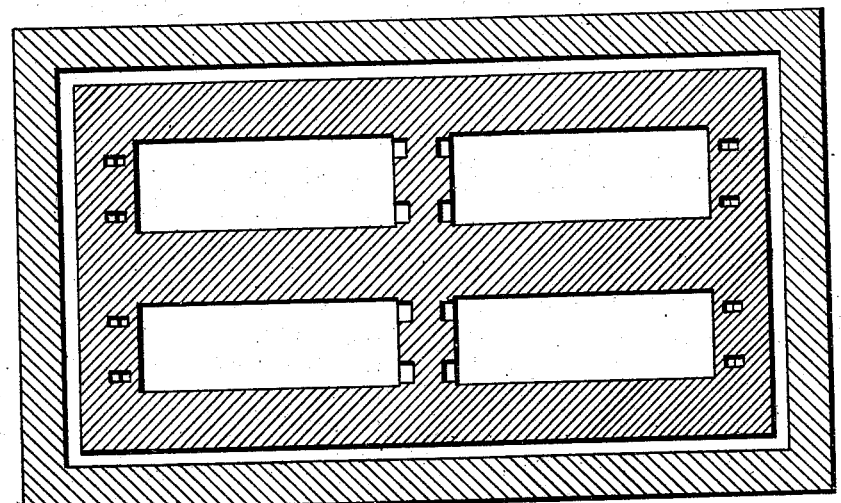

Referring to the accompanying drawings, Figure 1 is a longitudinal section, and Fig. 2 is a plan, of a cell according to my invention. Fig. 3 is a transverse section of a cell, and Fig. 4 is a sectional plan of a group of four cells in one structure.

The cell is built of magnesia bricks free from silica when lead is used, and it is lagged in any of the well-known ways.

The cell $a$ is provided with a port $g$, through which combustible gas—such as water-gas, coal-gas, producer-gas, petroleum, or other carbonaceous gas or vapor—is introduced under pressure. Through this port or a separate port $h$ may also be introduced under pressure a supply of oxygen or compounds containing oxygen, such as air or steam, which combining with the combustible material produces in the molten metal or alloy the necessary heat to maintain the temperature. It has been found out by experiment that in the case of easily-oxidizable metals—for instance, lead, antimony, or their alloys—which are suitable for batteries of this type the combustion of the air is perfect, so that the units of heat produced can be exactly regulated by the amount of air forced through, the combustible material being always somewhat in excess to prevent oxidation of the metal. In the closed cover $c$ of the cell an outlet-pipe $i$ is provided for the products of combustion.

The porous pot $b$, which is preferably of magnesia, is closed tightly with a cover $f$, through which pass an inlet-pipe $j$ and outlet-pipe $l$ for air. The pot $b$ is made from a paste consisting of magnesia with aqueous solution of boric acid molded and baked at an exceedingly-high temperature to a bright white heat. The inlet-pipe $j$ dips to the bottom of the porous pot, which contains the fused salt, and the outlet-pipe $l$ starts above the level of the fused salt. Salts suitable for this purpose are those highly-oxidized salts which are capable of parting with oxygen without being reduced to the metallic state—for instance, a mixture of potassium bichromate, chromium sesquioxid, and caustic potash or soda, with or without lead oxid. The porous pot $b$ is suitably kept in position on the bottom of the cell and is kept from rising out of the molten lead by the cover $c$ of the cell, which is perforated to allow the air-pipes to pass through it. The inlet-pipe $j$, preferably of wrought-iron, has horizontal branches $k$ extending along the bottom of the porous pot, these branches being perforated with holes to subdivide the air-streams. It may be employed as one electrode of the cell. The other electrode is an iron plate or pair of plates $m$, immersed in the lead and having conducting-limbs $n$.

The electromotive force of the current generated by this battery is from one to one and three-tenths volts, according to the temperature. The output of the battery is about forty watts per square foot of the immersed surface of the porous pot.

The molten metal may be introduced after the walls of the cell and the porous pot have been sufficiently heated by a blowpipe or other means, and then a supply of combustible gas or vapor is passed through the port and the metal under pressure together with the amount of air necessary to maintain the temperature. During the working of the cell air is blown through the molten salt and combustible gas or vapor is blown through the lead. As the action of the cell is such as to produce a certain amount of heat by the reduction of the metallic oxid, the temperature may rise beyond the desirable point. In this case an excess of air beyond that actually required to regenerate the salt is forced in, so as to cool the salt. As both the combustible gas and the air must be supplied in proportion to the output of the cell, the pumps which supply them under pressure may conveniently be driven by an electric motor, through the armature of which current of the cell passes, so that the speed of the pump may vary directly with the output of the cell. The heated products from the porous pot and from the molten metal may be applied to heat the entering air; but I prefer to deal with the products from the molten metal as follows: Taking the case of water-gas as the combustible employed, this, as is well known, contains hydrogen, carbon monoxid, and a small amount of nitrogen. After passing through the molten lead the products would be carbon dioxid, steam, and nitrogen. I take these products to the gas-generator and pass them over the red-hot coke instead of the steam which is generally employed. The carbon dioxid is thus converted into carbon monoxid and the steam is decomposed to hydrogen and oxygen, which latter, taking up carbon, produces carbon monoxid. The advantage gained by this method is that the cost of raising steam is saved and the heat of the products of combustion from the molten lead is fully utilized. As the volume of the products is doubled by combination with the carbon, half the volume must be allowed to pass away.

Instead of the single pot several pots with the necessary pipes and accessories may be arranged in one cell.

When a group of cells are electrically connected, they may conveniently be separated by partitions in one structure, as shown in Fig. 4, so that the loss of heat by radiation is reduced to a minimum.

As half the volume of combustion products has to be discharged, it is convenient to connect the pipes $i$ of the first, third, and other odd cells to the generator and those of the second, fourth, and other even cells to a chimney, suitable valves or dampers being provided for alternating or connecting the flues as may be desired.

Having thus described the nature of this invention and the best means I know of carrying the same into practical effect, I claim—

The method of supplying heat to a voltaic battery operating with fused materials, one of which is oxidizable, which consists in introducing combustible gas or vapor with a regulated quantity of oxygen, into the oxidizable and partly-oxidized material, effecting incomplete combustion within the cell and thereby heating and deoxidizing the material through which the gas or vapor passes.

In testimony whereof I have hereunto set my hand in presence of two subscribing witnesses.

WILLIAM STEPNEY RAWSON.

Witnesses:
GERALD L. SMITH,
WALTER J. SKERTEN.